US009156663B2

(12) United States Patent
Roeben et al.

(10) Patent No.: US 9,156,663 B2
(45) Date of Patent: Oct. 13, 2015

(54) DEVICE AND METHOD FOR ASCERTAINING AND MONITORING AN ASSEMBLED COUNTERWEIGHT ON A CRANE

(71) Applicant: Manitowoc Crane Group France SAS, Dardilly Cedex (FR)

(72) Inventors: Dieter Roeben, Wilhelmshaven (DE); Waldemar Mohr, Wilhelmshaven (DE); Oliver Titsch, Wilhelmshaven (DE)

(73) Assignee: Manitowoc Crane Group France SAS, Dardilly Cedex (FR)

(*) Notice: Subject to any disclaimer, the term of this patent is extended or adjusted under 35 U.S.C. 154(b) by 0 days.

(21) Appl. No.: 14/261,568

(22) Filed: Apr. 25, 2014

(65) Prior Publication Data

US 2014/0330481 A1 Nov. 6, 2014

(30) Foreign Application Priority Data

May 3, 2013 (EP) .................................... 13166348

(51) Int. Cl.

| | |
|---|---|
| ***G06F 19/00*** | (2011.01) |
| ***B66C 13/16*** | (2006.01) |
| ***B66C 23/72*** | (2006.01) |
| ***B66C 15/06*** | (2006.01) |
| ***B66C 23/74*** | (2006.01) |

(52) U.S. Cl.

CPC ................ *B66C 13/16* (2013.01); *B66C 15/06* (2013.01); *B66C 23/72* (2013.01); *B66C 23/74* (2013.01)

(58) Field of Classification Search

CPC ...... B66C 23/905; B66C 13/44; B66C 13/46; B66C 15/04; B66C 15/06

USPC .................. 701/33.9, 50; 212/195, 276, 685; 702/173

See application file for complete search history.

(56) References Cited

U.S. PATENT DOCUMENTS

| | | | | |
|---|---|---|---|---|
| 5,598,935 | A | 2/1997 | Harrison et al. | |
| 6,039,194 | A * | 3/2000 | Beeche et al. | 212/301 |
| 6,894,621 | B2 * | 5/2005 | Shaw | 340/685 |

(Continued)

FOREIGN PATENT DOCUMENTS

| | | | |
|---|---|---|---|
| DE | 102006046469 | A1 | 4/2008 |
| EP | 1724230 | A2 | 11/2006 |

(Continued)

OTHER PUBLICATIONS

EP Search Report, dated Oct. 7, 2013, for EP 13 166 348.6-1705 (Priority Document).

Notification of Reason(s) for Refusal with English translation for related Japanese Application No. 2014-091263, dated Mar. 31, 2015 (4 pages).

*Primary Examiner* — McDieunel Marc

(74) *Attorney, Agent, or Firm* — Craig Buschmann; Brinks Gilson & Lione

(57) ABSTRACT

A device for detecting and monitoring an assembled counterweight on a crane includes a turntable steelwork construction comprising a counterweight cylinder; a sensor which is arranged in the region of a connection between the counterweight cylinder and the turntable steelwork construction; and a computational unit (8), wherein the sensor is connected to the computational unit, and the computational unit comprises a logic which determines a weight of a counterweight which can be connected to the turntable steelwork construction from data which are captured by the sensor and transmitted to the computational unit.

14 Claims, 2 Drawing Sheets

(56) References Cited

U.S. PATENT DOCUMENTS

| | | | | |
|---|---|---|---|---|
| 7,340,373 | B2 * | 3/2008 | Shimomura | 702/173 |
| 2003/0214415 | A1 * | 11/2003 | Shaw | 340/685 |
| 2008/0288125 | A1 * | 11/2008 | Cameron | 700/302 |
| 2010/0070179 | A1 * | 3/2010 | Cameron | 701/301 |
| 2011/0084043 | A1 * | 4/2011 | Willim | 212/276 |
| 2012/0095653 | A1 * | 4/2012 | Morath et al. | 701/50 |
| 2014/0116975 | A1 * | 5/2014 | Benton et al. | 212/302 |

FOREIGN PATENT DOCUMENTS

| | | | |
|---|---|---|---|
| JP | 4-34290 | U | 3/1992 |
| JP | 9-58978 | A | 3/1997 |
| WO | WO 2012163190 | A1 | 12/2012 |

* cited by examiner

DEVICE AND METHOD FOR ASCERTAINING AND MONITORING AN ASSEMBLED COUNTERWEIGHT ON A CRANE

RELATED APPLICATIONS

The present patent document claims the benefit of priority to European Patent Application No. EP 13 166 348.6-1705, filed May 3, 2013, and entitled "DEVICE AND METHOD FOR ASCERTAINING AND MONITORING AN ASSEMBLED COUNTERWEIGHT ON A CRANE," the entire contents of each of which are incorporated herein by reference.

BACKGROUND

The invention relates to a device and method for ascertaining and monitoring an assembled counterweight on a crane.

In order to be able to operate a crane as economically as possible, it is advantageous if a counterweight of the crane is optimally adapted to a maximum bearing capacity and/or outreach of the crane for a particular task. This results in a relatively frequent change in the necessary weight of the counterweight, for example receiving additional counterweight parts or discharging superfluous counterweight parts, depending on the crane's task. Avoiding excessive counterweights, which are entrained in a rotational movement of the crane, helps to save fuel and reduce harmful emissions. Given the frequent changes, it can occur that the counterweights are not connected to the crane symmetrically, which at threshold exposures in particular can cause the crane to tip earlier than the user has calculated on the basis of the counterweight.

There is therefore a need for a device and/or method using which a permitted bearing load and outreach for a crane is ascertained in an optimised way for different assembly states.

DETAILED DESCRIPTION

Figure 1:
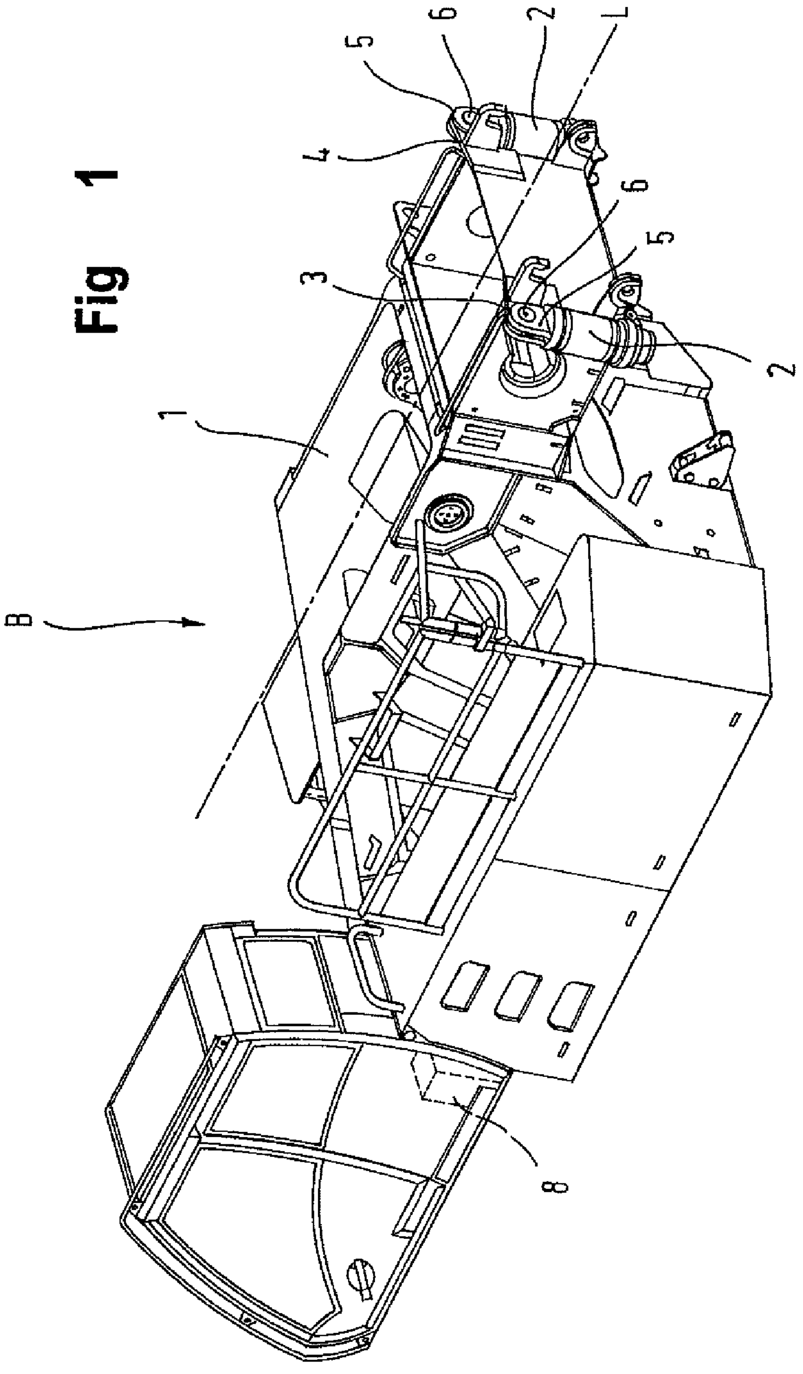
FIG. 1 is a superstructure of a crane comprising a turntable steelwork construction featuring two counterweight cylinders.

One aspect of the invention relates to a device for determining and monitoring an assembled counterweight of a crane.

The device comprises a turntable steelwork construction 1 for assembling a counterweight, comprising at least one counterweight cylinder 2. It also has a sensor 7 which is arranged in a region 9 of the turntable steelwork construction 1. The device is monitored by a computational unit 8.

The counterweight can be able to be connected to the turntable steelwork construction 1. It can be constructed from a plurality of separate counterweight parts, for example a plurality of separate plates 3, 4, which can be individually connected to the turntable steelwork construction 1. It is always the counterweight parts currently connected to the turntable steelwork construction 1 which together form a current weight exposure or a current counterweight on the turntable steelwork construction 1.

A weight exposure of the turntable steelwork construction 1 can be detected using the sensor 7, for example by way of the current counterweight, and relayed to a computational unit 8, wherein the sensor 7 can detect an elastic deformation of for example the turntable steelwork construction 1 due to the assembled counterweight.

The computational unit 8, which can be a separate computational unit or preferably an electronic crane safety device (RCL), comprises a logic or algorithm from which the computation unit can ascertain the current weight exposure of the turntable steelwork construction 1 from the data of the sensor 7. The computational unit 8 can refer to bearing load tables of the crane which are stored in the electronic crane safety device and contain among other things threshold values for an exposure of the crane assembled with different counterweights. The tables comprise threshold values for exposure to a load, a maximum length of a jib, a maximum length of a mast which can be telescoped out, etc., as a function of an assembled counterweight.

On the basis of the selected table, it is for example possible for the electronic crane safety device to determine that the current counterweight on the turntable steelwork construction 1 is sufficient for a current application of the crane or that it is too large or too small.

If a counterweight is ascertained to be sufficient, the crane can be operated without risk. If a counterweight is ascertained to be too small, the crane can for example tip in the direction of the jib, i.e. forwards, and the crane can only continue to be operated without risk if the counterweight is increased or the crane is returned to a secure operational range. If a counterweight is ascertained to be too large, the crane can tip backwards if the counterweight is not reduced. If a counterweight is permanently excessive for current crane operations but is not yet dangerous, the counterweight can be reduced in order to be able to operate the crane in an energy-saving way.

For ascertaining the current counterweight on the turntable steelwork construction 1, the at least one sensor 7 can detect a deformation in the turntable steelwork construction 1, and the computational unit 8 can determine an overall weight of the counterweight on the turntable steelwork construction 1 from the captured value of the deformation.

The sensor 7 can for example be an optical sensor which for example monitors an edge of the turntable steelwork construction 1 and detects changes in the position of the edge with respect to a predefined reference line.

The sensor 7 can be an elastically deformable sensor, for example a strain gauge, which is fastened to the turntable steelwork construction 1 in a suitable region 9 of the turntable steelwork construction 1 and detects a deformation in the turntable steelwork construction 1 in at least one direction. Two or three such strain gauges can detect deformations in the turntable steelwork construction 1 in different directions and relay them to the computational unit 8.

It is then for example possible to detect an asymmetrical exposure of the turntable steelwork construction 1 when the crane is for example not horizontal or the counterweights are not symmetrically attached on the turntable steelwork construction 1.

The sensor 7 can preferably be a press-in sensor. Press-in sensors can be retrofitted in existing mechanical elements, in order to detect a state of tension and therefore the exposure of the element.

Press-in sensors were developed for applications in which deformations in existing components due to external forces are to be measured. They are simple to install in existing components. Instead of a press-in sensor, a screw-in sensor can also be used.

The sensor 7 can be an elastic sensor, i.e. a sensor which can be elastically deformed in its installed location when a force from without acts on the part in which the sensor 7 is installed. This means that the deformation in the component is detected particularly reliably, since elastic deformation in the component leads directly to elastic deformation in the sensor 7.

The sensor 7 can be a sensor 7 comprising an amplifier, for example an integrated amplifier, i.e. the signal measured by the sensor 7 is amplified in the amplifier before being forwarded to the computational unit 8, such that even the smallest deformations in the turntable steelwork construction 1 detected by the sensor 7 can also be transmitted as a clearly perceptible signal to the computational unit 8. The sensor 7 can be arranged in a region 9 of a counterweight cylinder 2.

A "counterweight cylinder" refers to a cylinder which is used to receive the counterweight in cranes or mobile cranes such as truck-mounted cranes. The counterweight cylinder 2 is connected to the turntable steelwork construction 1 and comprises a piston which can for example be extended in order to grip and lift a counterweight, wherein "grip" is also understood to mean that one end of the piston of the counterweight cylinder 2 extends out of a cylinder housing, moves into or through an opening in the counterweight into a gripping position and is for example turned by 90° or otherwise secured in the gripping position. Said end of the counterweight cylinder 2 can then be retracted again, such that the counterweight is moved into a position in which it can be pivoted together with the turntable steelwork construction 1.

Alternatively, the counterweight cylinder 2 can be a fixed component of a counterweight base plate which can be connected to other counterweight plates. This counterweight base plate comprising the counterweight cylinder 2 can for example be deposited on the undercarriage of the crane and locked to the turntable steelwork construction 1. In order to lock it to the turntable steelwork construction 1, the counterweight cylinder 2 can press the entire counterweight block, consisting of the counterweight cylinder base plate, the counterweight cylinder 2 and optionally other counterweight plates, upwards in the direction of the turntable steelwork construction 1 into a locking position. Once locking is complete, the counterweight cylinder 2 can retract again and thereby pull the entire counterweight block upwards, such that the counterweight base plate and optionally the other counterweight plates are then suspended freely on or below the turntable steelwork construction 1 and can be pivoted and/or rotated, respectively, together with it.

The crane and/or the turntable steelwork construction 1 or the counterweight base plate, respectively, can comprise two counterweight cylinders 2. In this case, each of the counterweight cylinders 2 can be assigned a sensor 7, such that elastic deformations in the turntable steelwork construction 1 and/or the sensors 7, respectively, can be detected in the region 9 of the two counterweight cylinders 2, independently of each other, and relayed to the computational unit 8.

The deformations detected by the sensors 7 and/or the deformations in the two sensors 7, respectively, can be compared with each other in the computational unit 8, wherein a threshold value for a deviation between the two detected deformations can be predefined in the computational unit 8, wherein the computational unit 8 outputs an optical or audible warning signal when the threshold value is exceeded, in order to indicate to a crane operator that there is a problem with the counterweights.

The problem can be that counterweights have been received asymmetrically or that at least one of the counterweight cylinders 2 has malfunctioned, leading for example to a counterweight being received asynchronously by the two counterweight cylinders 2.

Being "received asymmetrically" is also understood to mean that each counterweight cylinder 2 receives its own counterweights or counterweight parts and the number of received counterweights or counterweight parts per counterweight cylinder 2 is not the same or the receiving speed of the cylinders is different.

The counterweight values captured by the sensors 7 can be compared in the computational unit 8 with a bearing load table for the crane which is stored in a memory of the computational unit 8 or the electronic crane safety device. Maximum bearing load values for the crane are stored in the table for each counterweight and/or overall counterweight, respectively, which is connected to the crane. The larger the counterweight, the greater the permitted bearing load of the crane in normal cases, i.e. the bearing load table provides a permitted or maximum exposure of the crane given a predefined counterweight, for example a permitted bearing load and/or a permitted outreach of the crane. Intermediate values or peripheral values can be interpolated and/or extrapolated. These ascertained values for the current assembly state of the crane can be outputted on an output unit, for example an optical output unit such as a screen or display, or via a printer, in order to inform the crane operator accordingly.

The electronic crane safety device can then for example check and document if this known permitted exposure is observed or exceeded.

Another aspect of the invention relates to a mobile crane comprising an undercarriage, a superstructure B, a turntable steelwork construction 1 which is connected to the superstructure B, and a device for automatically detecting a counterweight connected to the turntable steelwork construction 1.

The turntable steelwork construction 1 or the counterweight base plate which can be locked to the turntable steelwork construction 1 comprises at least one counterweight cylinder 2 by which a counterweight and/or counterweight plate, respectively, can be gripped, held and/or lifted.

A sensor 7 can detect an elastic deformation in the turntable steelwork construction 1 as or after the counterweights are received and can relay a signal, which represents the elastic deformation, to a computational unit 8.

The device can be the device described above, by which it is possible to determine that a counterweight is connected to the crane and to detect a weight of the counterweight and an arrangement of the counterweights and/or a counterweight distribution, respectively, on the turntable steelwork construction 1.

Another aspect of the invention relates to a method for automatically detecting and checking an assembly weight of a crane, in order to prevent the crane from tipping in the direction of a load and/or in the direction of a counterweight and/or to prevent the crane from being assembled asymmetrically.

In a first step of said method, a counterweight is connected to a turntable steelwork construction 1 of the crane. In a second step, an elastic deformation in the turntable steelwork construction 1 after the counterweight has been connected is detected by a sensor 7 and, in a third step, relayed to a computational unit 8.

In a fourth step, the value captured by the sensor 7 is compared in the computational unit 8 with a bearing load table for the crane which is stored in the computational unit 8 or in an electronic crane safety device. This means the computational unit 8 searches the bearing load table for the value of the counterweight detected by the sensor 7 and retrieves the corresponding threshold exposure values for the crane from the bearing load table. The threshold exposure values can be a maximum bearing load, a maximum outreach or other threshold exposure values for the crane in its configuration comprising the current counterweight detected.

The threshold load values thus ascertained can be outputted by the computational unit 8 on an output device, for example a screen, a display or a printer, as a printed table or threshold value curve.

If the threshold values are known, the crane operator can put the crane into operation. The computational unit 8 can monitor the crane, in particular monitor whether the ascertained threshold values are being observed, during operations and can warn the crane operator with acoustic, optical or tactile signals if the threshold values are exceeded.

If the steelwork construction or the counterweight base plate comprises two counterweight cylinders 2 and two sensors 7, then the values captured by the two sensors 7 can be compared with each other in the computational unit 8. The sensors 7 are preferably arranged at a distance from each other on the turntable steelwork construction 1 and exhibit the same vertical and horizontal distance from an upper edge of the counterweight facing the turntable steelwork construction 1.

If the comparison reveals a deviation between the captured values, this can mean that the crane is not horizontal or that the counterweight is assembled asymmetrically. If this asymmetrical exposure of the crane exceeds a predefined threshold value, the computational unit 8 can generate and output a warning signal, as already described.

A device for performing the method can be retrofitted in a crane, wherein the device is in particular the device described above for determining and monitoring an assembled counterweight on a crane.

It holds for the entire description and the claims that the expression "a(n)" is used as an indefinite article and does not limit the number of parts to one. Where "a(n)" has the meaning of "only one", this will be comprehensible to the person skilled in the art from the context or is unambiguously disclosed by the use of suitable expressions such as for example "one".

FIG. 1 shows a superstructure B of a mobile crane comprising a turntable steelwork construction 1 featuring two counterweight cylinders 2, in a perspective view from above. The rear end of the turntable steelwork construction 1 comprises two connecting plates 3, 4 which project transverse to a longitudinal direction L of the turntable steelwork construction 1 and are encompassed by a fork-like extension 5 of the counterweight cylinder 2 and connected by the latter to the counterweight cylinder 2 by means of a bolt 6.

Figure 2:
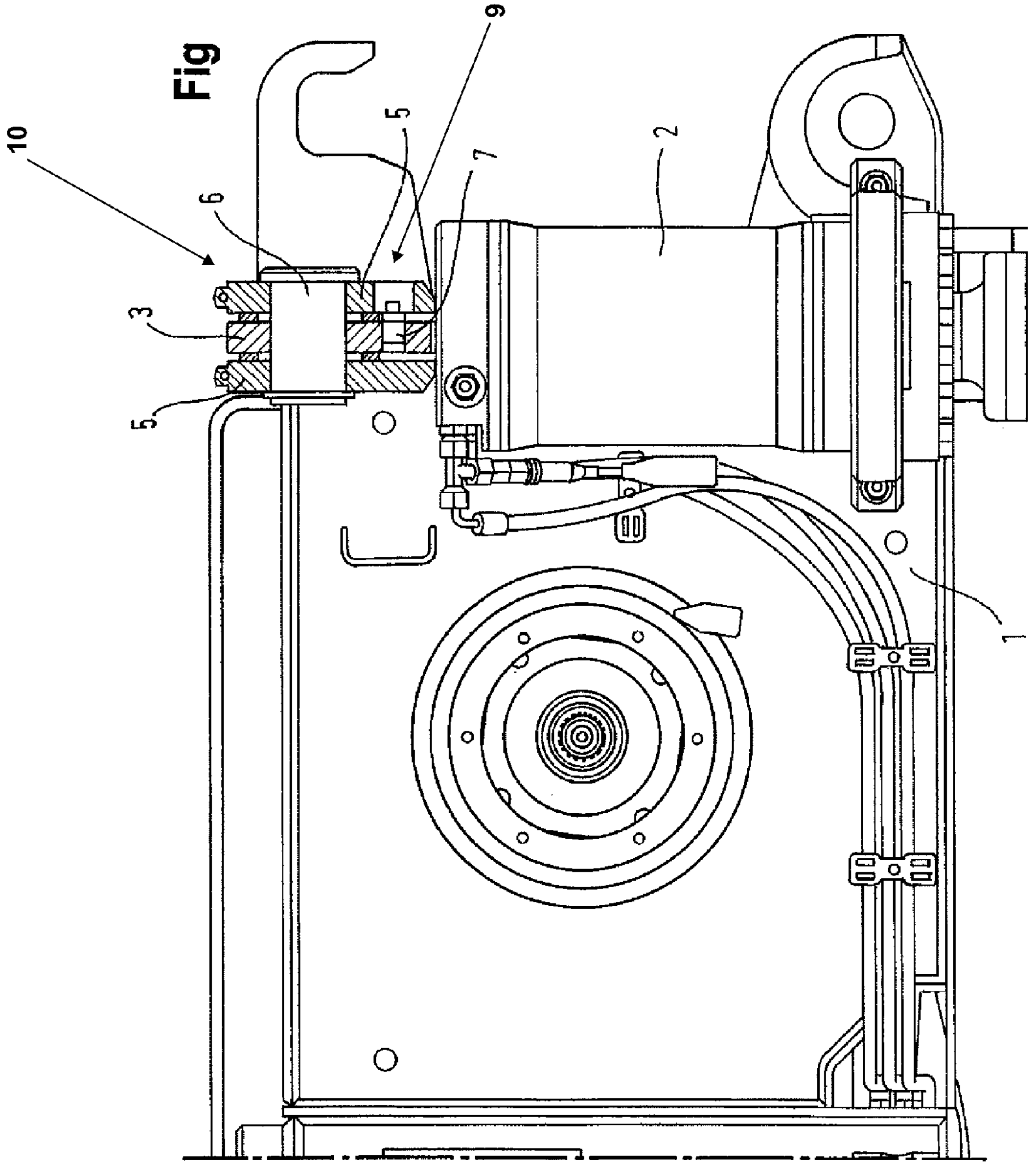
FIG. 2 is a lateral view of a turntable steelwork construction featuring a counterweight cylinder and a sensor.

FIG. 2 shows an enlarged detail of the turntable steelwork construction 1 of FIG. 1. It shows the counterweight cylinder 2 which is connected to the turntable steelwork construction 1.

The connection 10 between the turntable steelwork construction 1 and the counterweight cylinder 2, consisting of the fork-like extension 5, the connecting plate 3 and the bolt 6, is shown in a section through the middle of the bolt 6.

One of the sides of the fork-like extension 5 comprises a transit bore, and the connecting plate 3 comprises a bore. A press-in sensor 7 has been pressed through the transit bore, into the bore.

The invention claimed is:

1. A crane having a counterweight monitoring system, the crane comprising:

a. a turntable steelwork construction, b. a plurality of separate counterweight parts individually connectable to said turntable steelwork construction, c. a counterweight cylinder, d. at least one elastically deformable sensor connected to at least one of said turntable steelwork construction and said counterweight cylinder, and e. an electronic crane safety device (RCL), f. wherein data measured by said elastically deformable sensor representing an actual deformation of said elastically deformable sensor are sent to the RCL, and g. the RCL comprises a logic for calculating from the data sent by said elastically deformable sensor an overall calculated weight of the plurality of separate counterweight parts added to the turntable steelwork construction at a time at which said elastically deformable sensor measured the data, h. the RCL is configured to compare said overall calculated weight with the data of a bearing load table stored in a memory of the RCL, the bearing load table representing the weight of the crane with a respective number of the plurality of separate counterweight parts and defining at least one threshold value which restricts crane operations, and i. the RCL is configured to generate an output signal representative of said at least one threshold value and to transfer said output signal to an output device to give an operator said at least one threshold value.

2. The crane according to claim 1, wherein the elastically deformable sensor is selected from a group consisting of a press-in sensor and a screw-in sensor that can be pressed into or screwed into, respectively, a component of the turntable steelwork construction in order to detect a deformation.

3. The crane according to claim 1, wherein the elastically deformable sensor comprises an amplifier.

4. The crane according to claim 1, wherein the elastically deformable sensor is at least one of pressed or screwed into the turntable steelwork construction in the region in which the counterweight cylinder is connected to the turntable steelwork construction.

5. The crane according to claim 1, wherein the crane comprises two counterweight cylinders and two elastically deformable sensors, wherein each counterweight cylinder is assigned one of the elastically deformable sensors.

6. The crane according to claim 5, wherein the RCL compares the data of a deformation in one elastically deformable sensor with the data of a deformation in the other elastically deformable sensor and generates a warning signal when a predefined threshold value for a deviation between the two data is at least one of reached and exceeded.

7. The crane according to claim 1, wherein: a bearing load table for the crane is stored in the RCL; and at least one of a permitted outreach and a permitted bearing load of the crane for at least one predefined counterweight value can be retrieved from the bearing load table; and the RCL is configure to output at least one of the permitted outreach and the permitted bearing load on the output device.

8. The crane according to claim 1, wherein the turntable steelwork construction is part of a rotatable superstructure of the crane.

9. The crane according to claim 1, wherein the crane is a mobile crane.

10. A method for automatically checking an assembly weight for a crane by means of a device for determining and monitoring the assembly weight, in order to prevent the crane from tipping and/or to prevent the crane from being assembled asymmetrically, wherein:

a. in a first step, a counterweight element is connected to a turntable steelwork construction;

b. in a second step, a value of an elastic deformation in the turntable steelwork construction is detected by a sensor;

c. in a third step, the value detected by the sensor is relayed to an electronic crane safety device (RCL);
d. in a fourth step, the value detected is compared in the RCL with a bearing load table for the crane which is stored in a memory of the RCL; and
e. in a fifth step, the RCL retrieves at least one threshold load value for the crane from the load table and outputs it on an output device.

11. The method according to claim 10, further comprising in a sixth step, the RCL monitors whether the at least one threshold load value of the crane is being observed.

12. The method according to claim 10, wherein the turntable steelwork construction comprises two counterweight cylinders and two sensors and wherein the method further comprises:
a. the values of the elastic deformations in the turntable steelwork construction detected by the two sensors are compared with each other in the RCL;
b. if the values of the detected elastic deformations differ, the RCL determines an asymmetrical exposure of the crane; and
c. the RCL generates and outputs a warning signal for a crane operator.

13. The method according to claim 10, wherein the device is a device for detecting and monitoring an assembled counterweight on a crane.

14. A method for optimizing the working costs of a crane, wherein:
a. in a first step, at least one planned crane operation is identified by an operator and fed into a computational unit,
b. in a second step, a current weight of at least one removable counterweight on the crane is detected by a sensor and the current weight detected by the sensor is relayed to the computational unit,
c. in a third step, the computational unit calculates a minimum weight of a counterweight necessary to operate the crane safely during said planned crane operations,
d. in a fourth step, the computational unit compares a weight of counterweight present on the crane with a bearing load table comprising at least one threshold for a maximum bearing capacity and a maximum outreach of the crane needed for said planned crane operations,
e. in a fifth step the computational unit generates an output signal representing an optimal counterweight value for the planned operation, and
f. in a sixth step, the output signal is displayed as a readable information on an output device.

* * * * *